US011650484B1

(12) United States Patent
Liu et al.

(10) Patent No.: US 11,650,484 B1
(45) Date of Patent: May 16, 2023

(54) ELECTRONIC DEVICE WITH CAMERA STATUS INDICATOR

(71) Applicant: Apple Inc., Cupertino, CA (US)

(72) Inventors: Rong Liu, Sunnyvale, CA (US); Benjamin M. Oztalay, San Francisco, CA (US); Chenhua You, San Jose, CA (US); Corey S. Provencher, Santa Clara, CA (US); Florence W. Ow, Los Altos Hills, CA (US); Jeremy L. Britt, San Leandro, CA (US); Joshua A. Spechler, Cupertino, CA (US); Jun Qi, San Jose, CA (US); Ling Han, Santa Clara, CA (US); Shaofeng Liu, Santa Clara, CA (US); Sherry Cao, Cupertino, CA (US); Tavys Q. Ashcroft, San Jose, CA (US); Victor H. Yin, Cupertino, CA (US); Wenyong Zhu, San Jose, CA (US); Ziruo Hong, Cupertino, CA (US); Janos C. Keresztes, Santa Clara, CA (US); Hung Sheng Lin, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/943,835

(22) Filed: Jul. 30, 2020

Related U.S. Application Data

(60) Provisional application No. 62/884,019, filed on Aug. 7, 2019.

(51) Int. Cl.
*G03B 17/18* (2021.01)
*F21V 3/06* (2018.01)
(Continued)

(52) U.S. Cl.
CPC .......... *G03B 17/18* (2013.01); *F21V 3/0625* (2018.02); *H04N 5/23229* (2013.01);
(Continued)

(58) Field of Classification Search
CPC ....... G03B 17/18; F21V 3/0625; F21V 15/01; H05N 5/23229; H01L 23/04
See application file for complete search history.

(56) References Cited

U.S. PATENT DOCUMENTS 6,806,903 B1   10/2004  Okisu et al.
7,460,771 B2   12/2008  Yamasaki
(Continued)

FOREIGN PATENT DOCUMENTS

EP          2362637 A1 *   8/2011   .......... H04N 5/2256

*Primary Examiner* — Andrew J Coughlin
*Assistant Examiner* — Nathaniel J Lee
(74) *Attorney, Agent, or Firm* — Treyz Law Group, P.C.; G. Victor Treyz; Tianyi He

(57) ABSTRACT

An electronic device may have a camera. The camera may capture still and moving images. A camera status indicator may be included in the electronic device. The camera status indicator may emit light to indicate when the camera is in use capturing video or other images. The camera status indicator may have multiple light-emitting devices such as light-emitting diodes or lasers. The light-emitting devices may have different colors. Clear encapsulant may cover the light-emitting devices. A white polymer wall or other light recycling structure may run along an outer peripheral edge of the encapsulant. A light diffusing coating layer may coat an outer surface of the clear encapsulant. Light reflections from the status indicator may be reduced in captured images.

20 Claims, 11 Drawing Sheets

(51) Int. Cl.
*H04N 5/232* (2006.01)
*F21Y 113/17* (2016.01)
*F21Y 115/10* (2016.01)
*F21Y 115/30* (2016.01)
*F21W 111/00* (2006.01)

(52) U.S. Cl.
CPC ....... *F21W 2111/00* (2013.01); *F21Y 2113/17* (2016.08); *F21Y 2115/10* (2016.08); *F21Y 2115/30* (2016.08)

(56) References Cited

U.S. PATENT DOCUMENTS

| | | | |
|---|---|---|---|
| 8,967,806 | B2 | 3/2015 | Bublitz et al. |
| 9,888,189 | B2 | 2/2018 | Kageyama |
| 10,425,564 | B2 | 9/2019 | Aikawa |
| 2002/0080622 | A1* | 6/2002 | Pashley ............... F21S 10/02 362/555 |
| 2005/0073840 | A1* | 4/2005 | Chou ................... F21K 9/00 257/E25.02 |
| 2006/0008171 | A1* | 1/2006 | Petschnigg ........... G06T 5/50 382/254 |
| 2008/0136961 | A1* | 6/2008 | Latella ............... H04N 5/2256 348/E5.029 |
| 2008/0303411 | A1* | 12/2008 | Ohta ................... C09K 11/02 445/35 |
| 2012/0074432 | A1* | 3/2012 | Chou ................. H01L 25/167 257/E33.059 |
| 2016/0254416 | A1* | 9/2016 | Cheng ................ H01L 27/156 257/89 |
| 2018/0042477 | A1 | 2/2018 | Seitz et al. |
| 2018/0249549 | A1* | 8/2018 | Kim ..................... H05B 45/24 |
| 2019/0116350 | A1 | 4/2019 | Goto et al. |
| 2020/0005507 | A1 | 1/2020 | Tong |

\* cited by examiner

ELECTRONIC DEVICE WITH CAMERA STATUS INDICATOR

This application claims the benefit of provisional patent application No. 62/884,019, filed Aug. 7, 2019, which is hereby incorporated by reference herein in its entirety.

BACKGROUND

This relates generally to electronic devices and, more particularly, to electronic devices with cameras.

Electronic devices sometimes include cameras for capturing still and moving images. It is often not clear whether the camera is on and being used to capture an image or whether the camera is off. Challenges can therefore arise when operating an electronic device with a camera.

SUMMARY

An electronic device may have a camera. The camera may capture still and moving images. A camera status indicator may be included in the electronic device. The camera status indicator may emit light to indicate when the camera is in use capturing video or other image content.

The camera status indicator may have multiple light-emitting devices such as light-emitting diodes or lasers. The light-emitting devices may have different colors and may be mounted to a printed circuit. The light-emitting devices may be arranged on the printed circuit so that no peripheral edge of the light-emitting devices contains only light-emitting devices of a single color.

Clear encapsulant may cover the light-emitting devices. A white polymer wall or other light recycling structure may run along an outer peripheral edge of the encapsulant. A coating of clear polymer containing light-scattering particles may form a light diffuser coating layer on an outer surface of the clear encapsulant. A black wall may run around the outer edge of the light diffuser coating layer and the encapsulant and may be coupled to the printed circuit. The package formed from these structures may have an octagonal shape and may be received within a circular recess on an inner surface of a transparent protective member mounted in a device housing.

To prevent light reflections from the status indicator in captured images, status indicator operation may be synchronized with camera operation. With this arrangement, light from the status indicator is emitted only when the camera is insensitive to light. If desired, an electronic shutter may be used to prevent light from the status indicator from reaching the camera whenever a pulse of status indicator light is emitted. Polarizers and other arrangements may also be used to block reflected light. In some configurations, image processing operations may be used to identify and address reflections in captured images.

DETAILED DESCRIPTION

Electronic devices may include cameras. As an example, a visible light camera may be used in an electronic device such as a cellular telephone, head-mounted device, wristwatch device, computer, or other electronic device. The visible light camera in an electronic device may capture still and/or moving images.

A light-emitting status indicator may be mounted adjacent to a camera. During operation, the state of the status indicator may be adjusted in accordance with the operating mode of the camera. When the camera is off, for example, the indicator may be turned off or may exhibit a particular color (e.g., green). In this way, the user of the electronic device and/or people in the vicinity of the electronic device that are in range of the camera can be informed that the camera is currently not active. When the camera is needed to capture an image (e.g., video) and is turned on, the indicator light can be used to supply a different color of output light (e.g., red). This informs people that the camera is being used.

The indicator may have multiple light sources. The light sources may be lasers (e.g., laser diodes), light-emitting diodes such as organic light-emitting diodes or light-emitting diodes formed from crystalline semiconductor dies, and/or other light-emitting components. In an illustrative configuration, the indicator may have multiple light-emitting diodes or lasers forming pixels of different colors. By incorporating multiple pixels into the indicator, the indicator may have the ability to change color, to exhibit motion effects (e.g., chasing lights effects), and/or to emit other patterns of light. In this way, the indicator may serve as a versatile light-based output device for the electronic device.

In addition to or instead of being used to indicate the current status of a camera in the electronic device, an indicator may be used to provide a user with notifications (e.g., a notification that an email message or text message has been received), may be used to provide power status information (e.g., by flashing when power is low), may be used to provide information on the status of a count-down timer (e.g., to indicate to a user when the camera in the electronic device will be capturing an image), and/or may be used to provide output associated with other activities and/or status items in the electronic device. Configurations in which status indicators are used to indicate camera status may sometimes be described herein as an example.

Figure 1:
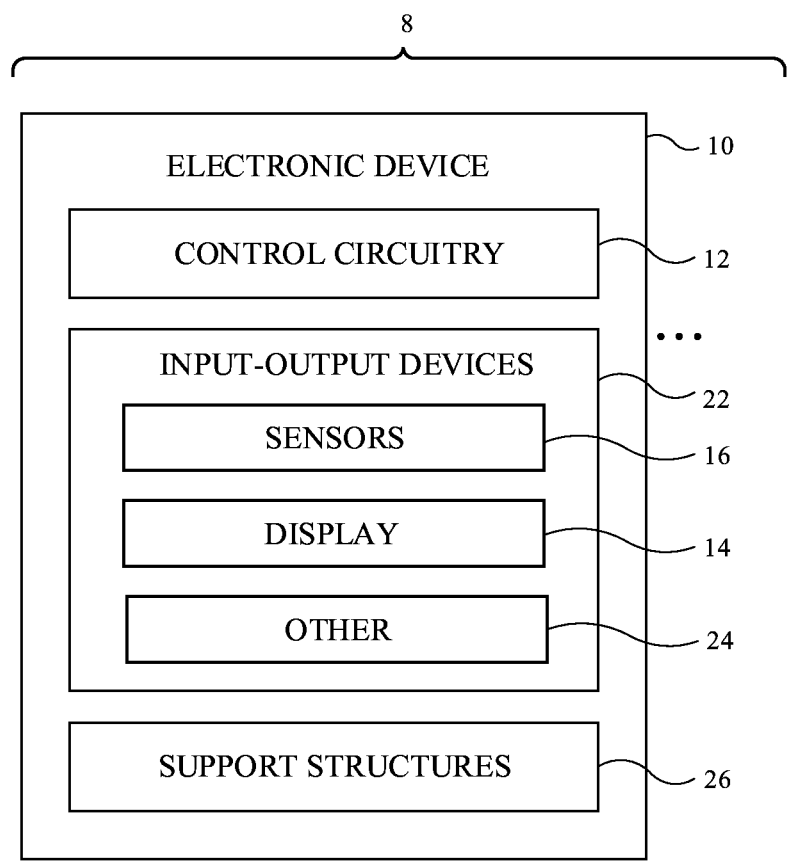
FIG. 1 is a schematic diagram of an illustrative electronic device in accordance with an embodiment.

FIG. 1 is a schematic diagram of an illustrative electronic device with a status indicator of the type that may be used as a camera status indicator. As shown in FIG. 1, system 8 may include one or more electronic devices such as electronic device 10. The electronic devices of system 8 may include computers, cellular telephones, head-mounted devices, wristwatch devices, and other electronic devices.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network (WiFi®) transceiver circuitry, millimeter wave transceiver circuitry, and/or other wireless communications circuitry.

In scenarios in which system 8 includes multiple electronic devices, the communications circuitry of the electronic devices (e.g., the communications circuitry of control circuitry 12 of device 10), may be used to support communication between the electronic devices. For example, one electronic device may transmit video and/or audio data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment. Arrangements in which system 8 includes a single device 10 may also be used.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as display(s) 14. In some configurations, display 14 of device 10 includes left and right display devices (e.g., left and right components such as left and right scanning mirror display devices, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display devices panels, and/or or other left and right display devices in alignment with the user's left and right eyes, respectively. In other configurations, display 14 includes a single display panel that extends across both eyes or uses other arrangements in which content is provided with a single pixel array. In handheld devices such as cellular telephones, a single pixel array may, for example, be formed on the front face of device 10. Cellular telephones, tablet computers, wristwatches, and other devices may also be provided with multiple displays, if desired.

Display 14 is used to display visual content for a user of device 10. In some arrangements, the content that is presented on display 14 may include computer-generated content (e.g., virtual objects). Computer-generated content may be displayed in the absence of real-world content or may be combined with real-world content. In some configurations, a real-world image may be captured by a camera (e.g., an outwardly facing camera) so that computer-generated content may be electronically overlaid on portions of the real-world image (e.g., when device 10 is a pair of virtual reality goggles with an opaque display). In other configurations, an optical coupling system may be used to allow computer-generated content to be optically overlaid on top of a real-world image. As an example, device 10 may have a see-through display system that provides a computer-generated image to a user through a beam splitter, prism, holographic coupler, or other optical coupler while allowing the user to view real-world objects through the optical coupler.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible cameras with respective infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources (e.g., status indicator lights formed from one or more light-emitting components), speakers such as ear speakers for producing audio output, and other electrical components. Device 10 may include circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structures 26 of FIG. 1. In configurations in which electronic device 10 is a wrist-mounted device, support structures 26 may include wrist straps. In configurations in which electronic device 10 is a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support display(s) 14, sensors 16, other components 24, other input-output devices 22, and control circuitry 12. In configurations in which device 10 is a handheld device such as a cellular telephone or tablet computer, support structures 26 may be omitted.

Figure 2:
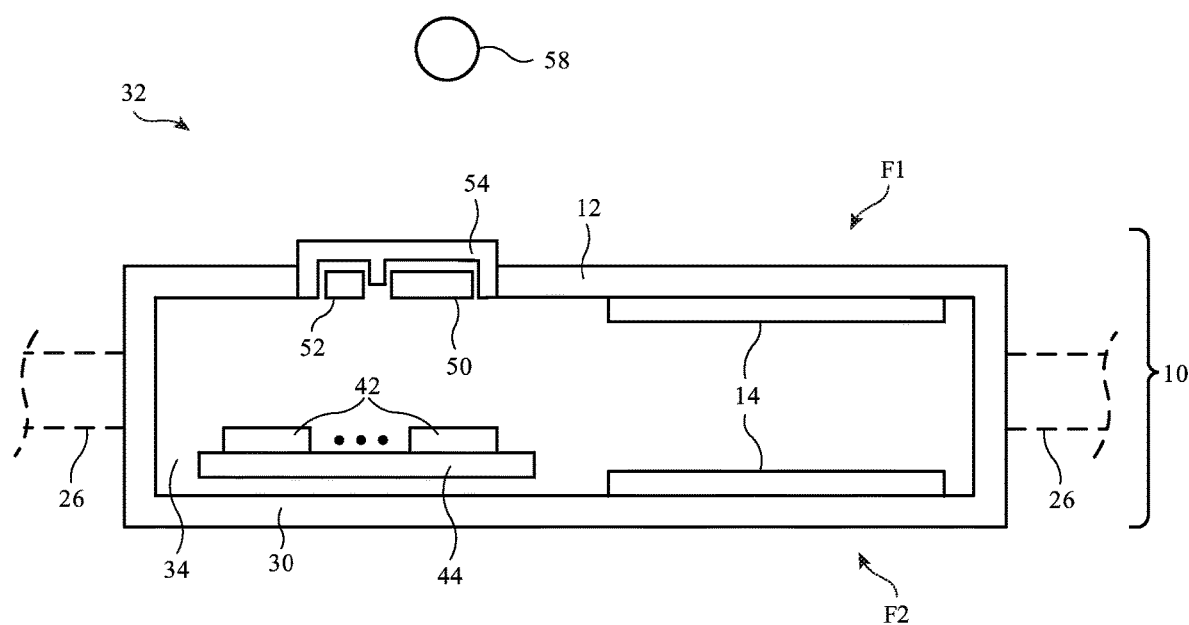
FIG. 2 is cross-sectional view of an illustrative electronic device in accordance with an embodiment.

FIG. 2 is a cross-sectional side view of an illustrative electronic device. As shown in FIG. 2, electronic device 10 may include optional support structures 26 (see, e.g., support structures 26 of FIG. 1). These support structures may be coupled to housing 30. Housing 30 may have housing walls that separate an external region such as exterior 32 (e.g., the external environment surrounding device 10) from an internal device region such as interior 34. Housing 30 may include housing walls and other structures formed from polymer, glass, crystalline material such as sapphire, metal, fiber composite materials such as carbon fiber materials and fiberglass, ceramic, natural materials such as wood, fabric, other materials, and/or combinations of these materials. One or more displays 14 may be mounted in device 10 (e.g., on face F1 and/or face F2 of device 10). Face F1 may be the front (outwardly facing) face of device 10 and face F2 may be the rear (inwardly facing) face of device 10 (e.g., when device 10 is a head-mounted device) or face F1 may be the rear (outwardly facing) face of device 10 and face F2 may be the front (inwardly facing) face of device 10 (e.g., when device 10 is a cellular telephone). Other configurations for mounting displays and other components in device 10 may be used, if desired. The portions of housing 30 that overlap display(s) 14 may be transparent (e.g., clear glass, sapphire, clear polymer, or other transparent material) and may sometimes be referred to as display cover layers.

Electrical components 42 may be mounted in interior 34 on one or more printed circuits such as printed circuit 44. Components 42 may include integrated circuits, discrete components such as inductors, resistors, and capacitors, sensors 16 and other input-output devices 22 of FIG. 1, circuitry such as control circuitry 12 of FIG. 1, batteries, and/or other devices.

As shown in FIG. 2, device 10 may include components such as camera 50 and a light-emitting component such as status indicator 52. Indicator 52 may be used to provide light output such as light output indicating the current operating mode of camera 50 and may sometimes be referred to as a camera indicator light, camera indicator, camera status indicator light, camera status indicator, status indicator, etc. Camera 50 may be a visible light camera and/or may include image sensors operable at other wavelengths (e.g., infrared wavelengths or ultraviolet wavelengths). Cameras such as camera 50 may include three-dimensional cameras such as structured light cameras, cameras with multiple lenses and image sensors that gather three-dimensional images through binocular optical arrangements, and/or other light sensing devices. In an illustrative configuration, which is sometimes described herein as an example, camera 50 is a visible light camera for capturing still and/or moving images.

Cameras and camera indicators can be mounted in any suitable location within device 10 (e.g., under transparent housing structures, in alignment with holes or transparent regions in housing 30 that serve as camera and indicator light windows, etc.). In the illustrative example of FIG. 2, camera 50 and indicator 52 have been mounted under transparent member 54 in an outwardly-facing location where camera 50 can capture images of external objects such as object 58 and where indicator 52 can emit light in the direction of object 58 (e.g., to serve as a visual status indicator for a person in the camera's field of view).

Transparent member 54 may be formed from sapphire or other crystalline material, glass, polymer, or other transparent material that allows member 54 to serve as an optical component window. Because member 54 is transparent, camera 50 can receive image light from exterior 32 through member 54 and indicator 52 can emit light that passes through member 54 and is viewable by a user in exterior 32. Member 54 may be a circular member (e.g., a disk), a rectangular member (e.g., a sheet of transparent material), or other suitable structures for protecting camera 50 and indicator 52. If desired, the inwardly facing surface of member 54 may have one or more recesses for receiving components such as camera 50 and indicator 52 (e.g., to help minimize the overall thickness of device 10). These recesses may have circular outlines (e.g., the recesses may be shallow cylindrical recesses that do not pass through the entire thickness of member 54).

Figure 3:
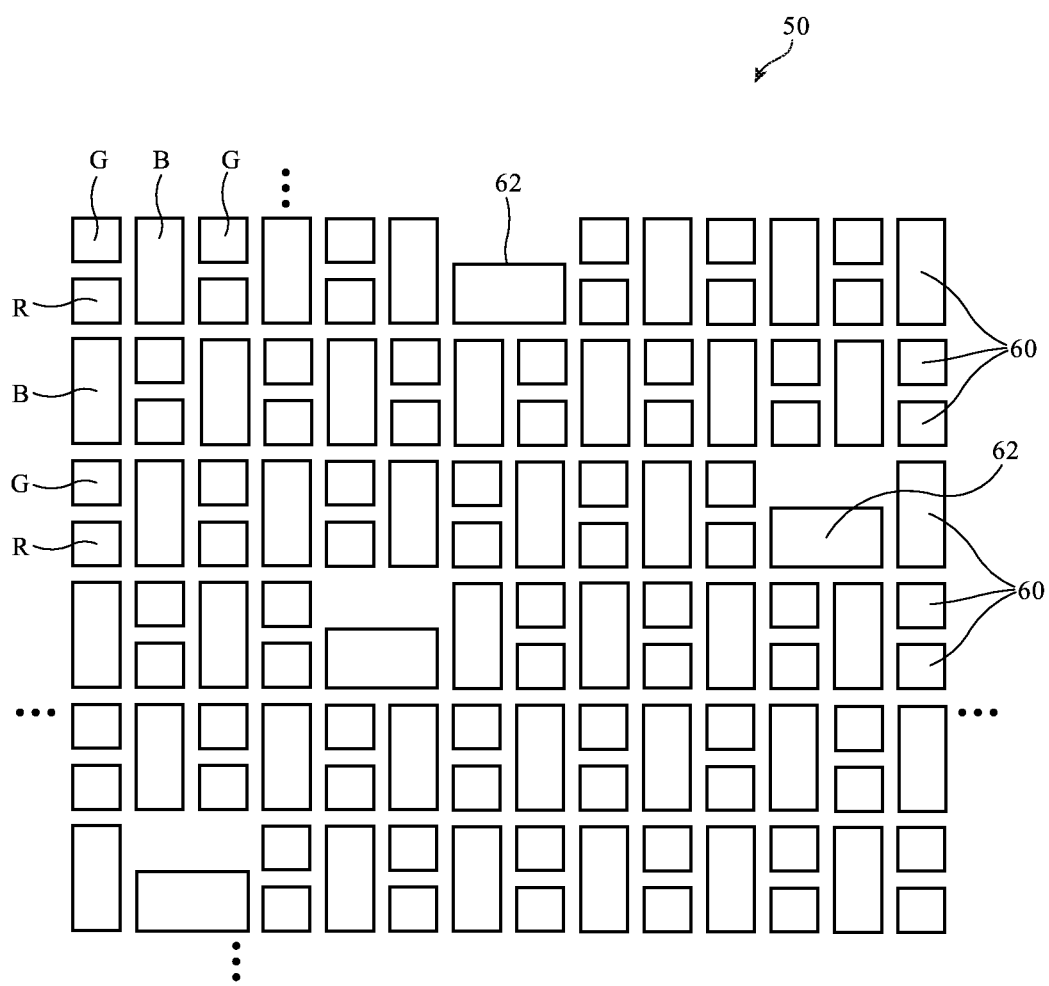
FIG. 3 is a diagram of an illustrative pixel and component layout for a status indicator in accordance with an embodiment.

Indicator 52 may be formed from multiple light-emitting devices. These devices, which may sometimes be referred to as pixels, may be formed from light-emitting diodes, lasers (e.g., vertical cavity surface emitting diodes, laser diodes formed from crystalline semiconductor dies, etc.). The light-emitting elements of indicator 52 may be arranged in any suitable pattern. As shown in the example of FIG. 3, indicator 52 may include an array of light-emitting devices 60. The size of the array and the number of devices 60 of FIG. 3 is illustrative. More devices 60 may be included in indicator 52 or fewer devices 60 may be included in indicator 52, if desired.

Devices 60 may include green light-emitting devices G, blue light-emitting devices B, and red light-emitting devices R. The illustrative pattern of FIG. 3 may be used to intersperse red, green, and blue devices with each other so that indicator 52 may produce output light with desired patterns, colors, and intensities. If desired, optional additional components 62 may be interspersed with devices 60 (e.g., in a random pattern to reduce or eliminate visibility of these components to the naked eye). Components 62 may include, for example, one or more of sensors 18, one or more other components 24, etc.

Figure 4:
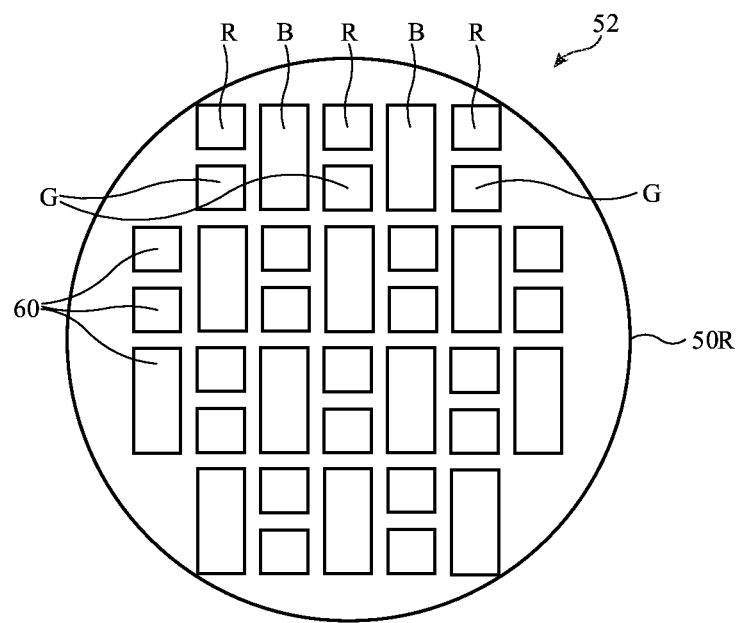
FIG. 4 is a diagram of an illustrative status indicator in accordance with an embodiment.

FIG. 4 is a top view of indicator 52 in an illustrative configuration in which light-emitting devices 60 have been arranged to fit within circular outline 50R, thereby making indicator 52 appear circular to an observer. The four corners of a square array of devices 60 have been removed, leaving four exposed peripheral edges. To prevent undesired color fringing along the border of indicator 52, the different colors of devices 60 may be distributed in a balanced pattern. In particular, red devices R, green devices G, and blue devices B may be arranged in indicator 52 so that none of the peripheral edges (e.g., the top, bottom, left, and right edges of FIG. 4) of indicator 52 have only a single color of device 60.

The diameter of indicator 52 may be at least 1 mm, at least 1.5 mm, 2 mm, at least 3 mm, less than 10 mm, less than 5 mm, less than 4 mm, less than 3 mm, less than 2.5 mm, or other suitable value. Devices 60 may be separated by sub-pixel gaps (e.g., gaps that are smaller than the smallest lateral dimension of devices 60). As an example, devices 60 may be separated by gaps of less than 50 microns, less than 100 microns, less than 200 microns, less than 300 microns, at least 5 microns, at least 10 microns, or other suitable values. Devices 60 may have lateral dimensions of 50-500 microns, 200 microns, 100-300 microns, at least 75 microns, at least 100 microns, less than 800 microns, less than 600 microns, less than 400 microns, less than 250 microns, less than 300 microns, or other suitable dimensions. As an example, red and green devices 60 may be 175 by 200 micron devices and blue devices 60 may be 200 by 400 micron devices.

Figure 5:
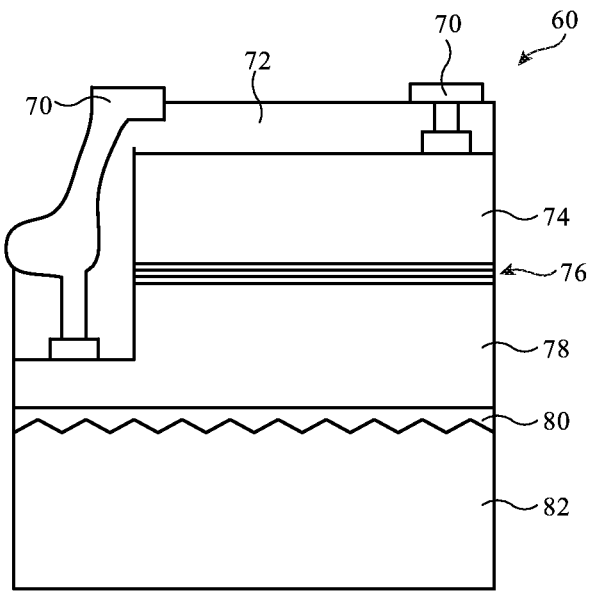
FIG. 5 is a cross-sectional side view of an illustrative light-emitting diode in accordance with an embodiment.

A flip-chip arrangement may be used in forming devices 60, so that wire bonds need not be used in interconnecting the terminals of devices 60 with signal lines on printed circuit substrates. Green and blue devices 60 (e.g., gallium nitride devices) may be grown on sapphire substrates. Sapphire is transparent, so emitted green and blue light may pass through the substrate when green and blue devices 60 are flip-chip bonded to printed circuit signal lines. Red devices 60 may be grown from a semiconductor such as gallium arsenide, which is opaque to red light. To allow red devices 60 to be flip-chip mounted, polishing and/or etching techniques may be used to remove the gallium arsenide substrate from red devices 60 after initial growth. Initially, the layers making up red devices 60 may be grown on a gallium arsenide substrate. The red devices 60 may then be bonded face down on a sapphire substrate. The exposed gallium arsenide substrate may be removed and the processing of the red devices may be completed, producing devices of the type shown by illustrative red device 60 of FIG. 5. As shown by device 60 of FIG. 5, device 60 may have a sapphire substrate such as substrate 82. A bonding layer such as bonding layer 80 (e.g., a polymer adhesive layer) may be used in attaching the semiconductor layers of device 60 to substrate 82. Device 60 may be formed from a multiple quantum well layer such as layer 76 sandwiched between p-type gallium arsenide layer 78 and n-type gallium arsenide layer 74. Distributed Bragg reflector (DBR) and isolation layer 72 may be formed between the semiconductor structures of device 60 and terminals 70.

Figure 6:
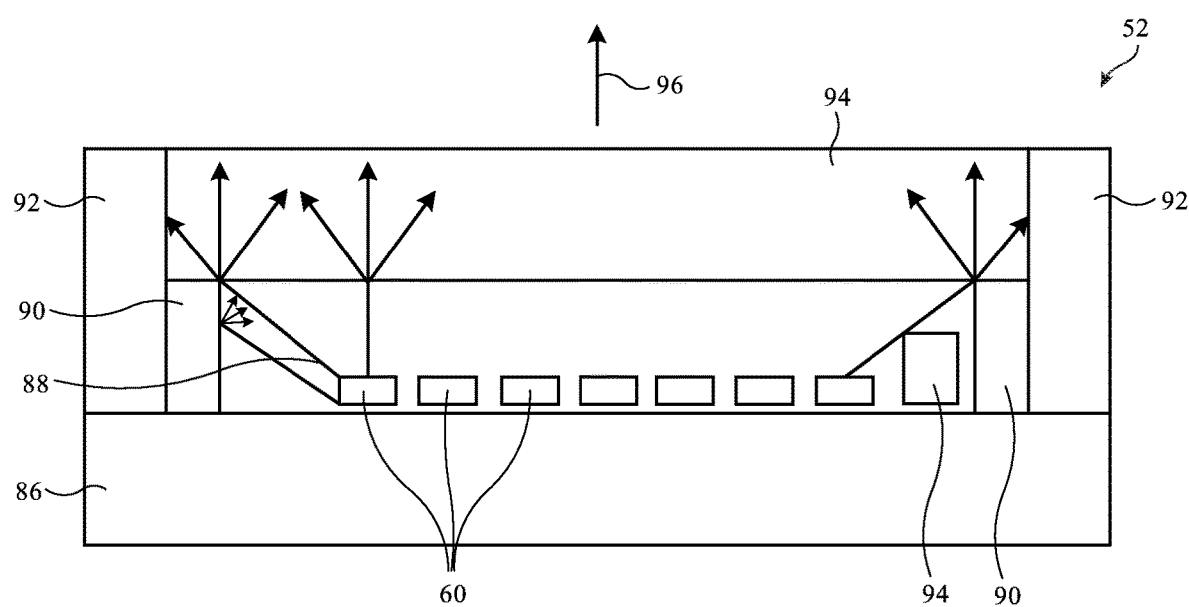
FIG. 6 is a cross-sectional side view of an illustrative status indicator in accordance with an embodiment.

A cross-sectional side view of an illustrative packaging arrangement for mounting devices 60 to form indicator 52 is shown in FIG. 6. As shown in FIG. 6, indicator 52 may have multiple light-emitting devices 60 of different colors mounted (e.g., flip-chip bonded using solder or conductive adhesive) to printed circuit 86. Clear encapsulant 88 (e.g., clear polymer such as clear silicone or other clear material) may cover devices 60 to help protect devices 60 from moisture and other environmental contaminants. The thickness of encapsulant 88 may be at least 0.05 mm, at least 0.1 mm, 0.25 mm, less than 0.5 mm, or other suitable thickness.

Light-recycling structures such as white walls 90 may be formed from polymer with embedded light-scatting particles (e.g., inorganic particles such as titanium dioxide particles or other particles with a refractive index that varies from the refractive index of the polymer). White walls 90 may be formed in a ring running along the peripheral edge of encapsulant 88 to help recycle light that has been emitted from devices 60 and that is traveling laterally outwards (e.g., by reflecting this light outwardly in direction 96).

Diffuser layer 94 may be formed from polymer with light-scattering structures (e.g., bubbles or other voids, bumps and/or ridges on the surfaces of layer 94, and/or embedded light-scattering particles such as particles of titanium dioxide or other material with a refractive index that varies from the refractive index of the polymer). Diffuser layer 94 may serve as a light diffuser that helps homogenize light emitted by devices 60. The thickness of diffuser layer 94 may be at least 0.05 mm, at least 0.1 mm, 0.25 mm, less than 0.5 mm, or other suitable thickness. Diffuser layer 94 may be formed as a coating on the upper surface of encapsulant 88.

Opaque walls 92 (e.g., black walls formed from black polymer) may run along the peripheral edge of indicator 52 and may help to block stray light from the layer of encapsulant 88 over devices 60 and the diffuser formed from layer 94. Opaque walls 92 and the other structures of indicator 52 may be coupled to printed circuit 86, thereby forming a package for devices 60 and indicator 52.

The polymer material used in forming the package for indicator 52 (e.g., encapsulant 88, light diffuser coating layer 94, etc.) may be silicone or other polymer that can withstand elevated temperatures (e.g., solder reflow temperatures of 180-240° C., etc.). One or more temperature sensors such as temperature sensor 94 may be mounted to printed circuit 86 within the package of indicator 52 to monitor operating temperature. Temperature sensor 94 may be, for example, a negative temperature coefficient thermistor.

In the illustrative arrangement of FIG. 6, diffuser layer 94 is formed as a coating on encapsulant 88. If desired, a light diffuser for indicator 52 may be formed from a separate sheet of diffusive material (e.g., a polymer layer with light-scattering structures that is separate from layer 88 and that is not formed as a coating on layer 88). The sheet of diffusive material may be attached to layer 88 with adhesive.

Figure 7:
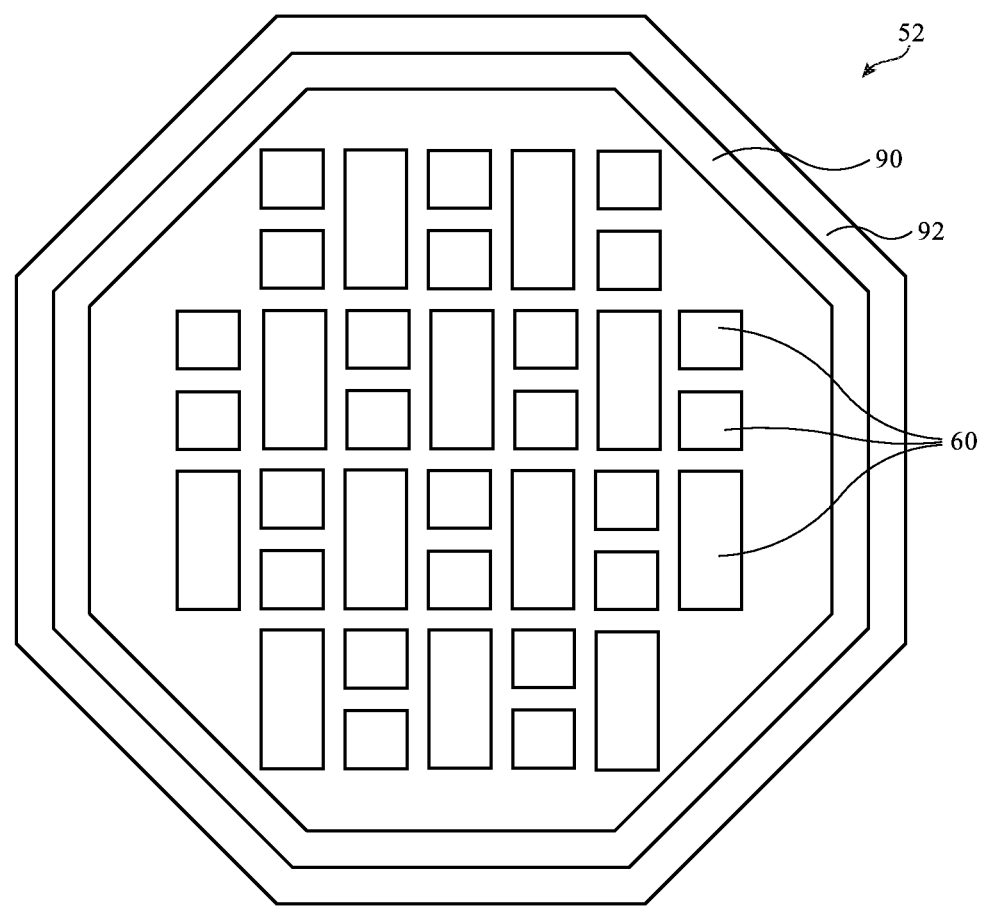
FIG. 7 is a top view of an illustrative indicator with an octagonal package in accordance with an embodiment.

The package for indicator 52 may have a rectangular footprint (outline when viewed from above) or may have other suitable shapes. A top view of an illustrative configuration for indicator 52 when indicator 52 has an octagonal outline is shown in FIG. 7. When an octagonal shape is used for indicator 52, multiple indicators can be formed in a large panel that is singulated using horizontal cuts, vertical cuts, and diagonal cuts (e.g., cuts made with a saw, laser, etc.). At the same time, the octagonal shape of FIG. 7 helps allow indicator 52 to fit within a cylindrical recess in the underside of member 54. Particularly with some window materials (e.g., sapphire), use of a drill bit to produce recesses in member 54 results in cylindrical recesses with circular outlines. Octagonal indicators can fit more effectively within these recesses than rectangular indicators.

It may be desirable to use indicator 52 to indicate the current state of camera 50. For example, when camera 50 is actively gathering video (or is turned on and ready to capture an image when a shutter release button is pressed) indicator 52 can produce first illumination (e.g., a first color and/or a first still and/or moving light pattern). When camera 50 is turned off or is otherwise inactive and not capturing video or other images (and/or is deactivated so as to be incapable of capturing images), indicator 52 can produce second illumination (e.g., a second color and/or a second still and/or moving light pattern). As an example, indicator 52 may be red when camera 50 is capturing a moving image (video) and can be green or dark when no video is being captured.

When indicator 52 is illuminated, the light emitted by indicator 52 has the potential to create an undesired reflection. For example, if a user is capturing video with camera 50 while device 10 is pointed at a glass window, the window may reflect the light emitted by indictor 52 back towards camera 50. This may give rise to an undesired reflection (e.g., a bright spot) in the captured image.

Figure 8:
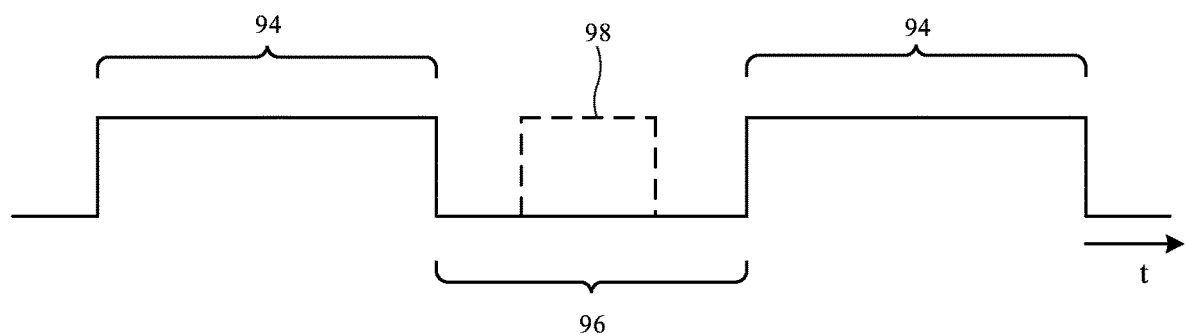
FIG. 8 is a timing diagram of illustrative synchronized operations involving a camera and a camera status indicator in an electronic device in accordance with an embodiment.

Accordingly, device 10 may be configured to suppress reflections from indicator 52. With one illustrative arrangement, which is illustrated by the timing diagram of FIG. 8, light output from indicator 52 is synchronized with camera periods where camera 50 is insensitive to light. During active camera periods 94, images are captured and rows of image sensor pixels are read out by the image sensor control circuitry of camera 50. During inactive camera periods 96 (e.g., periods of about 1 ms or less per image frame or other suitable inactive camera periods), the image sensor of camera 50 is not actively capturing images and is insensitive to light. During use of camera 50 to capture video, periods 94 alternate with periods 96. Because reflections of light from indicator 52 will not be detected during periods 96, the presence of undesired reflections of indicator light in captured images can be avoided by only activating the light-emitting devices 60 of indicator 52 during periods of time such as indicator active period 98 of FIG. 8 that lie within periods 96. By limiting light emission of indicator 52 to those portions of the operation of camera 50 where the image sensor of camera 50 is not sensitive to light, images containing reflections of indicator 52 can be avoided. Inactive periods 96 can be produced by ensuring that the row read out times of a rolling shutter image sensor are timed to ensure a sufficiently large gap between periods 94 or by using a global shutter image sensor with a satisfactory inactive period 96. To avoid flicker, it may be desirable for the image sensor frame rate and the light emission rate for indicator 52 to be greater than 60 Hz. Other image capture frame rates and repetition rates for light output from indicator 52 may be used, if desired.

Figure 9:
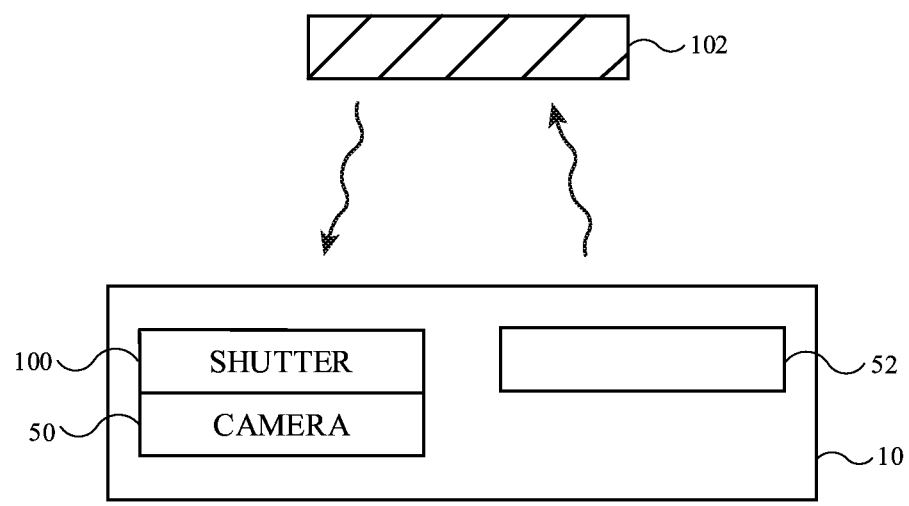
FIG. 9 is a diagram of an illustrative electronic device with a shutter for blocking indicator light reflections in accordance with an embodiment.

Another way in which to suppress indicator reflections in captured images involves the use of an electronic shutter such as shutter 100 of FIG. 9. Shutter 100 may be a liquid crystal shutter, a mechanical shutter, or other suitable electrically controllable light modulator that can be placed in transparent and opaque states. Shutter 100 overlaps camera 50 and can therefore block reflections of emitted light from indicator 52 when this light reflects from an external object such as object 102. During operation, control circuitry 12 may be used to synchronize the operation of indicator light 52 and electronic shutter 100. When camera 50 is active, there is a risk that reflected light from indicator 52 can create undesired reflections in the image being captured by camera 50. Control circuitry 12 therefore closes shutter 100 each time indicator 52 is used to emit light. With an illustrative configuration, indicator 52 is used to emit pulsed light at frequency f (e.g., a frequency greater than 60 Hz, greater than 200 Hz, greater than 1000 Hz, less than 1 MHz, or other suitable pulse rate). Each light emission pulse may have a relatively short duration (e.g., less than 1 ms, less than 100 microseconds, less than 10 microseconds, greater than 1 ns, etc.). In synchronization with each light emission pulse, control circuitry 12 causes shutter 100 to transition from a transparent state to an opaque state. The duration of the opaque state is sufficient that each light emission pulse occurs only during a time period in which shutter 100 is opaque. In this way, reflected light from indicator 52 is not captured by camera 50.

Figure 10:
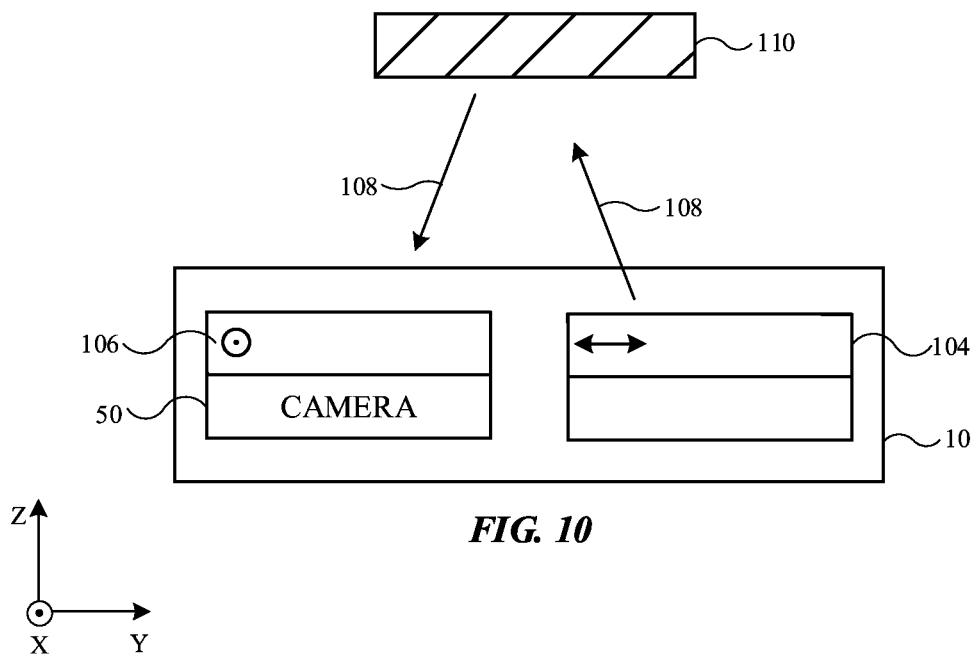
FIG. 10 is a diagram of an illustrative electronic device with polarizer structures for blocking indicator light reflections in accordance with an embodiment.

A polarization-based configuration for suppressing indicator reflections is illustrated in FIG. 10. In the example of FIG. 10, linear polarizer 104 overlaps indicator 52. The pass axis of linear polarizer 104 is aligned with the Y axis of FIG. 10, so linear polarizer 104 linearly polarizes light emitted from indicator 52 along the Y axis. Linear polarizer 106 overlaps camera 50. The pass axis of linear polarizer 106 is aligned with the X axis of FIG. 10 and is therefore orthogonal to the pass axis of linear polarizer 104. As a result of this arrangement, light 108 that is emitted by indicator 52 and that reaches reflective external object 110 is polarized along the Y axis. The pass axis of polarizer 106 is orthogonal to the linear polarization axis of light 108, so that when light 108 reflects from object 110 and reaches polarizer 106, polarizer 106 blocks light 108. If desired, electrically adjustable liquid crystal polarizers or other time-varying polarizers may be used in device 10. For example, polarizer 106 may be an electrically adjustable polarizer that is turned on only when indicator 52 is active.

If desired indicator reflections in captured images can be suppressed by reducing the on-axis emission intensity of indicator 52. Microlouvers, light collimating films (e.g., upside down prism films), lenses, diffraction gratings, and/or other structures may be used to reduce the intensity of light that is emitted by indicator 52 in a direction parallel to the surface normal of indicator 52. At off-axis orientations (e.g., at 5-90° from the surface normal or other suitable range of angles), the brightness of emitted light from indicator 52 can be relatively large. The reduction of on-axis emitted light will help reduce reflections from flat surfaces that are perpendicular to device 10 and other reflective objects that tend to reflect emitted light directly back to the emitter. At the same time, by maintaining or increasing off-axis light emission intensity from indicator 52, people in the vicinity of device 10 can view indicator 52 satisfactorily.

Another indicator light reflection mitigation approach that may be used by device 10 involves image processing. With this approach, images are captured that contain undesired reflections of indicator light 52. The reflections are then analyzed to detect the reflections and appropriate action taken. For example, identified reflections may be removed from the captured images by image processing.

Figure 11:
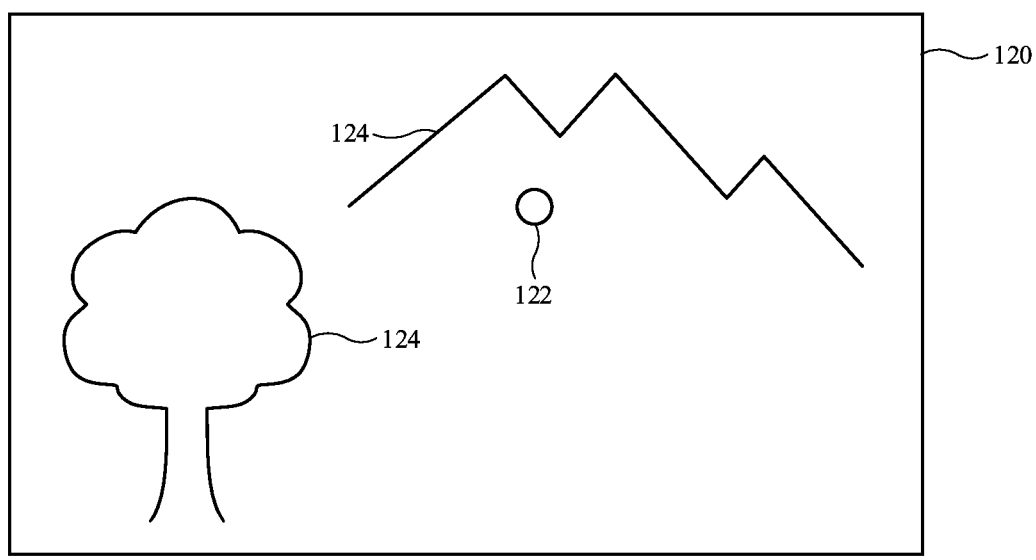
FIG. 11 is a diagram of an illustrative captured image with an indicator light reflection in accordance with an embodiment.

Consider, as an example, illustrative captured image 120 of FIG. 11. As shown in FIG. 11, image 120 may contain images of real-world objects 124. Image 120 may also contain reflected light from indicator 52. For example, a reflected image of indicator 52 may appear in the form of a small circular artifact, as shown by status indicator reflection 122 of FIG. 11.

Figure 12:
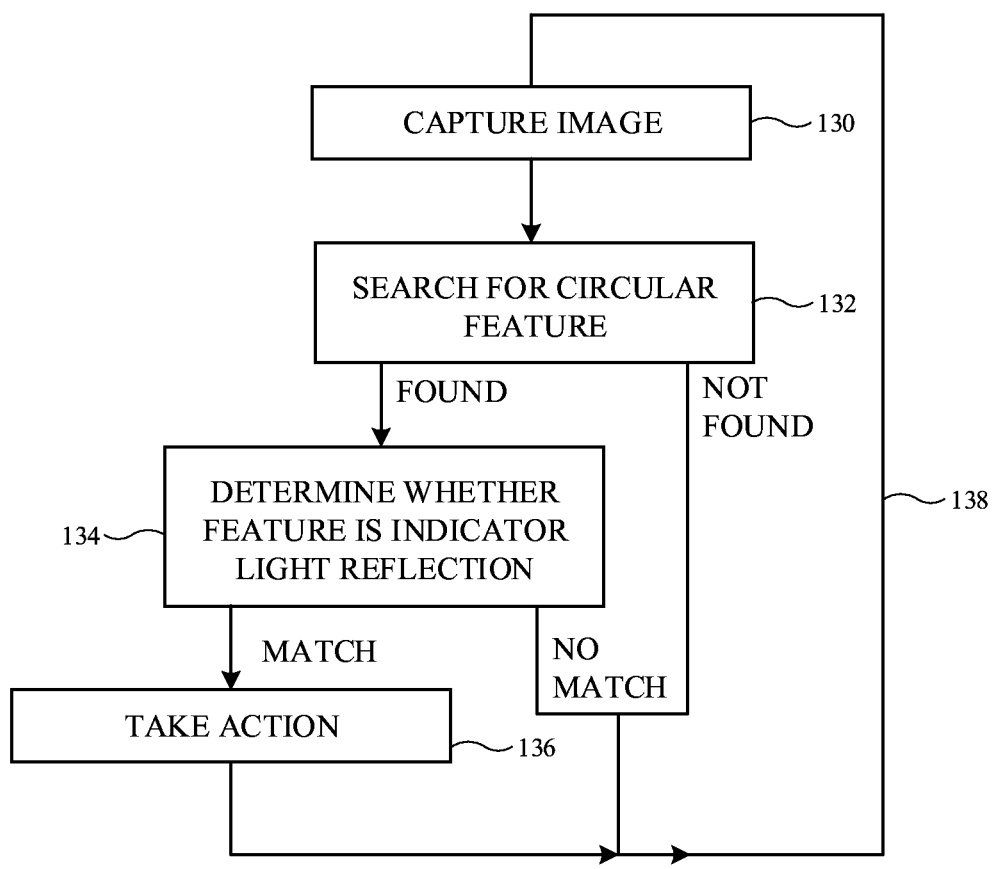
FIG. 12 is a flow chart of illustrative operations involved in operating a device with a camera and a camera status indicator in accordance with an embodiment.

Illustrative operations in identifying reflection 122 and removing reflection 122 from image 120 or taking other appropriate action are shown in FIG. 12. During the operations of FIG. 12, control circuitry 12 may recognize and remove undesired reflections from captured images or take other suitable action.

During the operations of block 130, a user may press a shutter release button (e.g., a physical button, a touch screen button, or other suitable button) or an image capture operation may be initiated automatically, thereby causing control circuitry 12 to use camera 50 to capture image 120 (FIG. 11). Image 120 may be a video image with multiple frames or a still image. A glass window pane or other reflective object may be located within the field of view of camera 50 during the image capture operation. As a result, light that is emitted from indicator 52 will reflect from this object and will be present in captured image 120, as illustrated by reflection 122 of FIG. 11.

During the operations of block 132, a pattern recognition algorithm implemented on control circuitry 12 is used to scan image 120 for the presence of a potential indicator light reflection such as reflection 122. Potential reflections may be identified based on factors such as artifact size, color, and shape. If desired, emitted light may be modulated (e.g., as a function of time) and the camera image data captured by camera 50 can be processed to detect the modulation (e.g., by making frame-to-frame comparisons of captured image content in a scenario in which indicator 52 is turned on and off during alternating captured image frames, etc.). Emitted light may also be tagged by co-emitting infrared light (e.g., 900 nm light) that can be detected in a captured image. In some configurations, a phase time-of-flight sensor, self-mixing sensor, or other sensor with distance discrimination capabilities and/or an infrared structured light three-dimensional image sensor (e.g., a three-dimensional image sensor operating at 940 nm or other suitable infrared wavelength) can help identify the shape and location of reflective surfaces such as windows that tend to create indicator light reflections. When a detected reflective surface is detected as being present, a reflection-sized artifact in image 120 can be considered to potentially be due to a reflection.

In the event that the search operations of block 132 do not identify any potential reflected images of indicator 52, processing may loop back to block 130, as indicated by line 138.

In response to detecting a circular feature in image 120 that has attributes such as shape, color, and/or size attributes that potentially match those of an indicator light reflection or otherwise detecting a potential reflection, processing may proceed to block 134. For example, if control circuitry 12 detects a bright round object with a size similar to that expected from a reflection of indicator 52, processing may proceed to bock 134. During the operations of block 134, additional image processing may be performed to determine whether the circular feature (or other suspected reflection) identified during bock 132 corresponds to an indicator reflection. These operations may involve, for example, analysis of the color of reflected light, data analysis to determine whether circular feature contains any signatures of indicator light modulation, time-of-flight sensor analysis and/or three-dimensional image sensor analysis, image processing operations on the current frame and/or previous frames to measure the size, shape, and color of the suspected reflection and to analyze its appearance over time, and/or other image processing operations. In response to determining that the suspected light reflection does not correspond to an indicator light reflection, processing may loop back to block 130 as shown by line 138.

If, however, an indicator light is identified during the operations of block 134, appropriate corrective action can be taken in response. In particular, during the operations of block 136, control circuitry 12 can temporarily turn off indicator light 52 so that reflection 122 is not present in subsequent captured images (or in succeeding portions of a video currently being captured) and/or control circuitry can perform image processing operations on captured image 120 to remove reflection 122. For example, captured image data can be processed so that reflection 122 is replaced with the colors and shapes of nearby image regions, thereby visually obscuring reflection 122 in the processed image.

System 8 may gather and use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device, comprising:
   a camera;
   a camera status indicator that is configured to emit light to indicate when the camera is capturing an image; and
   control circuitry configured to identify a reflection of the emitted light in the captured image and to temporarily turn off the camera status indicator, in response to identifying the reflection of the emitted light in the captured image, when the camera is capturing subsequent images.

2. The electronic device defined in claim 1 wherein the camera status indicator has multiple light-emitting devices.

3. The electronic device defined in claim 1 wherein the electronic device comprises a transparent member, the camera status indicator is configured to emit the light through the transparent member, the camera is configured to capture the image through the transparent member, and the light-emitting devices comprise light-emitting devices selected from the group consisting of: lasers and light-emitting diodes.

4. The electronic device defined in claim 1 wherein the control circuitry is configured to perform image processing operations on the captured image that remove the reflection from the captured image.

5. The electronic device defined in claim 1 wherein the camera status indicator has a light-diffusing coating.

6. The electronic device defined in claim 1 wherein the camera status indicator has an octagonal package.

7. An electronic device, comprising:
   a housing;
   a camera in the housing that is configured to capture video; and
   a camera status indicator configured to emit light to indicate when the camera is capturing the video, wherein the camera status indicator includes:
   light-emitting devices,
   a light diffuser formed from a diffusive coating that overlaps the light-emitting devices,
   a light recycling wall surrounding the light emitting devices, and
   a black wall running along a peripheral edge of the light recycling wall.

8. The electronic device defined in claim 7 wherein the light-emitting devices comprise light-emitting devices of different colors.

9. The electronic device defined in claim 8 wherein the camera status indicator comprises encapsulant that covers the light-emitting devices of different colors and wherein the diffusive coating coats a surface of the encapsulant.

10. The electronic device defined in claim 9 wherein the light recycling wall surrounds a peripheral edge of the encapsulant and wherein the light recycling wall is configured to recycle the emitted light.

11. The electronic device defined in claim 8 further comprising control circuitry configured to synchronize operation of the camera status indicator with the camera so that the emitted light indicating that the camera is capturing video is emitted during periods in which the camera is momentarily insensitive to light.

12. The electronic device defined in claim 8 wherein the light-emitting devices are arranged in a pattern where no straight peripheral edge of the light-emitting devices has light-emitting devices of only a single color.

13. The electronic device defined in claim 7 wherein the camera status indicator has an octagonal package, the electronic device has a transparent member, and the transparent member has a cylindrical recess that receives the octagonal package.

14. The electronic device defined in claim 13 further comprising a non-light-emitting electrical component in the octagonal package.

15. The electronic device defined in claim 14 wherein the light-emitting devices are arranged in an array and wherein the non-light-emitting electrical component is a sensor located in the array.

16. An electronic device, comprising:
   a camera; and
   a status indicator including:
      a printed circuit;
      light-emitting devices on the printed circuit, wherein the light-emitting devices comprise red devices, blue devices, and green devices and wherein no peripheral edge of the light-emitting devices contains only light-emitting devices of a single color;
      a non-light-emitting electrical component on the printed circuit and interspersed between the light-emitting devices;
      clear encapsulant covering the light-emitting devices and the non-light-emitting electrical component;
      a light diffusing coating on the clear encapsulant;
      a light recycling wall surrounding the clear encapsulant and comprising a white wall; and
      a black wall running along a peripheral edge of the white wall.

17. The electronic device defined in claim 16 wherein the light diffusing coating comprises silicone containing light-scattering particles.

18. The electronic device defined in claim 16 wherein the status indicator further includes a thermistor on the printed circuit.

19. The electronic device defined in claim 16 wherein the printed circuit is coupled to an octagonal package.

20. The electronic device defined in claim 16, wherein the non-light-emitting electrical component comprises a sensor on the printed circuit and interspersed between the light-emitting devices.

* * * * *

UNITED STATES PATENT AND TRADEMARK OFFICE
CERTIFICATE OF CORRECTION

| | |
|---|---|
| PATENT NO. | : 11,650,484 B1 |
| APPLICATION NO. | : 16/943835 |
| DATED | : May 16, 2023 |
| INVENTOR(S) | : Rong Liu et al. |

It is certified that error appears in the above-identified patent and that said Letters Patent is hereby corrected as shown below:

In the Claims

Column 12, Line 22, "The electronic device defined in claim 1" should read -- The electronic device defined in claim 2 --

Signed and Sealed this
Twentieth Day of February, 2024

*Katherine Kelly Vidal*

Katherine Kelly Vidal
*Director of the United States Patent and Trademark Office*